United States Patent
Kang (10) Patent No.: US 9,565,086 B2
(45) Date of Patent: Feb. 7, 2017

(54) NETWORK-TRANSMISSION INSPECTION DEVICE AND NETWORK-TRANSMISSION INSPECTION METHOD

(71) Applicant: Wistron NeWeb Corp., Hsinchu (TW)

(72) Inventor: Fu-Ming Kang, Hsinchu (TW)

(73) Assignee: Wistron NeWeb Corp., Hsinchu (TW)

(*) Notice: Subject to any disclaimer, the term of this patent is extended or adjusted under 35 U.S.C. 154(b) by 684 days.

(21) Appl. No.: 14/026,652

(22) Filed: Sep. 13, 2013

(65) Prior Publication Data

US 2014/0177453 A1 Jun. 26, 2014

(30) Foreign Application Priority Data

Dec. 25, 2012 (TW) .............................. 101149696 A (51) Int. Cl.
*H04L 12/26* (2006.01)
*H04W 24/08* (2009.01)

(52) U.S. Cl.
CPC .......... *H04L 43/0811* (2013.01); *H04W 24/08* (2013.01)

(58) Field of Classification Search
CPC .............................. H04W 24/02; H04W 24/08
USPC ........................................................ 370/242
See application file for complete search history.

(56) References Cited

U.S. PATENT DOCUMENTS

| 7,890,620 B2 | 2/2011 | Masuda et al. | |
|---|---|---|---|
| 2006/0198305 A1* | 9/2006 | Hamdi | H04L 41/12 370/232 |
| 2008/0028369 A1 | 1/2008 | Sasaki et al. | |
| 2008/0225733 A1* | 9/2008 | Hua | H04L 45/00 370/242 |

FOREIGN PATENT DOCUMENTS

| CN | 101384054 A | 3/2009 |
|---|---|---|
| TW | 200805945 A | 1/2008 |

* cited by examiner

*Primary Examiner* — Wei Zhao
*Assistant Examiner* — Abdeltif Ajid
(74) *Attorney, Agent, or Firm* — Muncy, Geissler, Olds & Lowe, P.C.

(57) ABSTRACT

The present invention discloses a network-transmission inspection method, applied to a network-transmission inspection device, including: connecting a network-connection module with a base station through a network by a network-communication device; checking whether the number of RX packets received by the network-connection module from the base station has increased at a first predetermined time interval when the network-connection module is connected with the base station; checking whether the number of TX packets transmitted by the network-connection module to the base station has increased when the number of RX packets has not increased; checking whether the connection between the network-connection module and the network-communication device is functioning properly when the number of TX packets has not increased; and increasing the network abnormal number by 1 when the connection is not functioning properly.

22 Claims, 9 Drawing Sheets

NETWORK-TRANSMISSION INSPECTION DEVICE AND NETWORK-TRANSMISSION INSPECTION METHOD

CROSS REFERENCE TO RELATED APPLICATIONS

This application claims priority of Taiwan Patent Application No. 101149696, filed on Dec. 25, 2012, the entirety of which is incorporated by reference herein.

BACKGROUND OF THE INVENTION

Field of the Invention

The present invention relates to a network-transmission inspection method, and in particular to a network-transmission inspection method arranged to check respective transmission paths with fewer checking packets.

Description of the Related Art

Presently, mobile devices are highly developed and multifunctional. For example, handheld devices such as mobile phones and tablets are capable of conducting telecommunications, receiving and transmitting e-mails, maintaining social networks, managing contacts, and playing media, wherein most of the above functions require network connection.

However, errors and disruptions frequently occur when the electronic device is connected with a network. Users usually do not notice the errors and disruptions of connection the first time. Furthermore, it requires the user to manually re-connect the network or re-start the network module, such that it causes inconvenience for users in some conditions. Moreover, the existing network inspection methods require lots of network efforts and produce unnecessary packet fees. Therefore, an efficient method for inspecting connection errors is needed.

BRIEF SUMMARY OF THE INVENTION

A detailed description is given in the following embodiments with reference to the accompanying drawings.

The present invention discloses a network-transmission inspection device. The network-transmission inspection device includes a network-connection module and a network-transmission inspection module. The network-connection module is arranged to connect to a base station through a network by a network-communication device according to an enable signal, wherein the network-connection module is arranged to receive at least one RX packet from the base station by the network-communication device and transmit at least one TX packet to the base station by the network-communication device. The network-transmission inspection module is arranged to check the connection status between the network-connection module and the base station, and the network-transmission inspection module further includes a counting device, a packet-inspection module and a local inspection module. The counting device is arranged to accumulate a network abnormal number. The packet-inspection module is arranged to check whether the number of RX packets and the number of TX packets have increased at a first predetermined time interval when the network-connection module is connected with the base station. The local inspection module is arranged to check whether the connection between the network-connection module and the network-communication device is functioning properly when both the number of RX packets and the number of TX packets have not increased, and enable the counting device to increase the network abnormal number by 1 when the connection between the network-connection module and the network-communication device is not functioning properly.

The present invention further discloses a network-transmission inspection method, applied to a network-transmission inspection device. The network-transmission inspection method includes: connecting a network-connection module of the network-transmission inspection device with a base station through a network by a network-communication device according to an enable signal; checking whether the number of RX packets received by the network-connection module from the base station through the network-communication device has increased at a first predetermined time interval when the network-connection module is connected with the base station; checking whether the number of TX packets transmitted by the network-connection module to the base station through the network-communication device has increased when the number of RX packets has not increased; checking whether the connection between the network-connection module and the network-communication device is functioning properly when the number of TX packets has not increased; and increasing a network abnormal number by 1 when the connection between the network-connection module and the network-communication device is not functioning properly.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
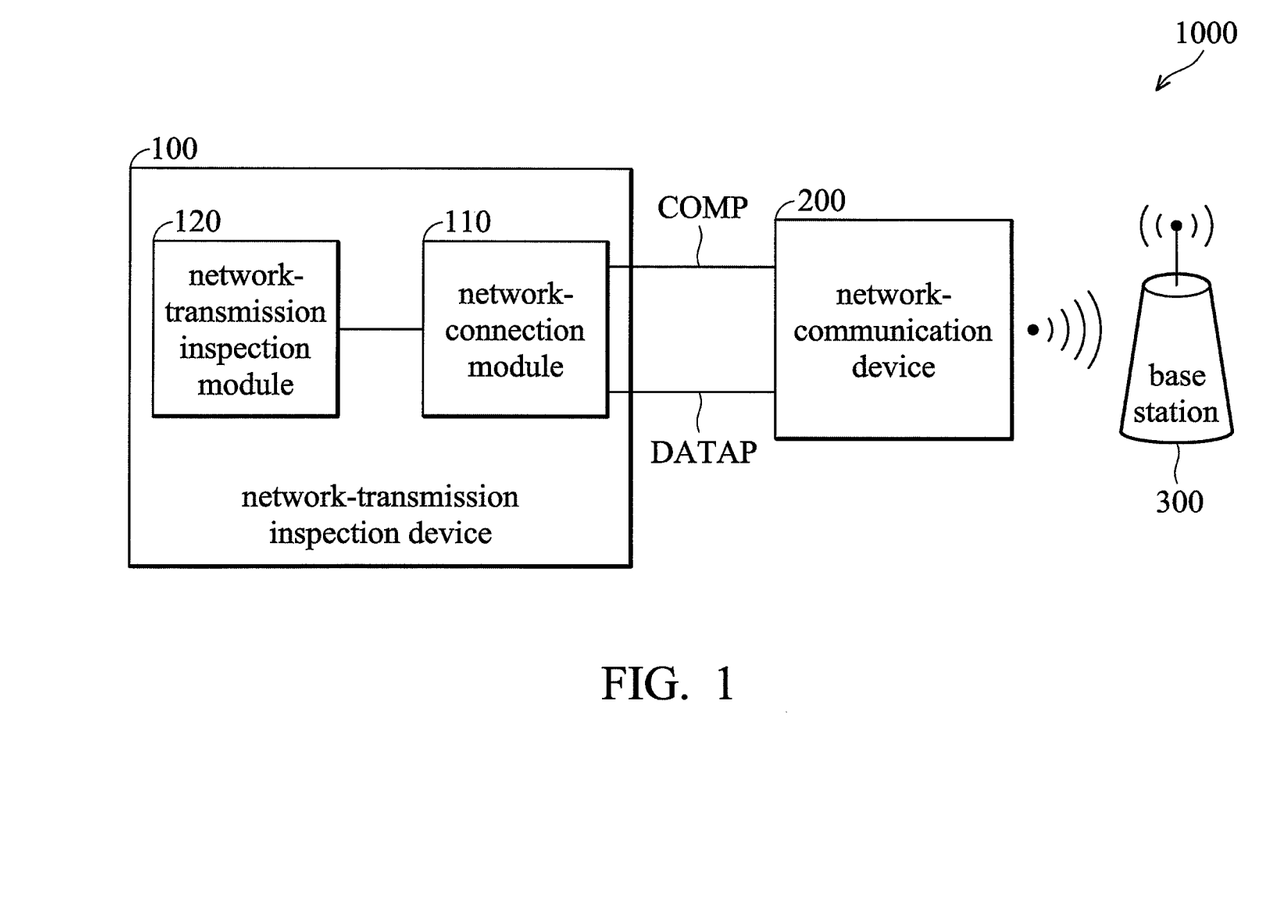
FIG. 1 is a schematic diagram illustrating an embodiment of a network transmission system of the present invention.

FIG. 1 is a schematic diagram illustrating an embodiment of a network transmission system of the present invention. The network transmission system 1000 includes a network-transmission inspection device 100, a network-communication device 200 and a base station 300.

The network-transmission inspection device 100 is an electronic device arranged to be coupled to the network-communication device 200, but it is not limited thereto. The electronic device 100 can be implemented on various digital cameras or computer system configurations, such as hand-held devices, multi-processor systems, microprocessor-based or programmable consumer electronics, mini-computers, tablet computers, desktop computers, and similar devices, but it is not limited thereto. Moreover, the network-transmission inspection device 100 further includes a network-connection module 110 and a network-transmission inspection module 120. The network-connection module 110 is arranged to connect to the base station 300 through a network by a network-communication device 200 according to an enable signal, wherein the network-connection module 110 is arranged to receive at least one RX packet from the base station 300 by the network-communication device 200 and transmit at least one TX packet to the base station 300 by the network-communication device 200. The network-transmission inspection module 120 is arranged to check the connection status between the network-connection module 110 and the base station 300. It should be noted that the network-transmission inspection device 100 produces the enable signal in response to input from users, but it is not limited thereto. In another embodiment, the network-transmission inspection device 100 produces the enable signal according to whether the network-communication device 200 is connected to the network-transmission inspection device 100. Moreover, a control path COMP and a data transmission path DATAP are coupled between the network-communication device 200 and the network-connection module 110. The control path COMP is arranged to transmit commands and control signals of the network-communication device 200 and the network-connection module 110. The data transmission path DATAP is arranged to transmit the RX packet(s) of the base station 300 from the network-communication device 200 to the network-connection module 110, and transmit the TX packet(s) of the network-connection module 110 to the network-communication device 200.

The network-communication device 200 is arranged to connect to the base station 300 through the network according to the command of the network-connection module 110, such that the network-transmission inspection device 100 can communicate with the base station 300. It should be noted that the network-communication device 200 connects to the base station 300 through a 4G network, but it is not limited thereto. For example, the network-communication device 200 can also connect to the base station 300 by a 3G network, wired network, wireless fidelity (WIFI) or other networks. In another embodiment of the present invention, the network-communication device 200 is arranged to be implemented in the network-transmission inspection device 100, but it is not limited thereto.

Figure 2:
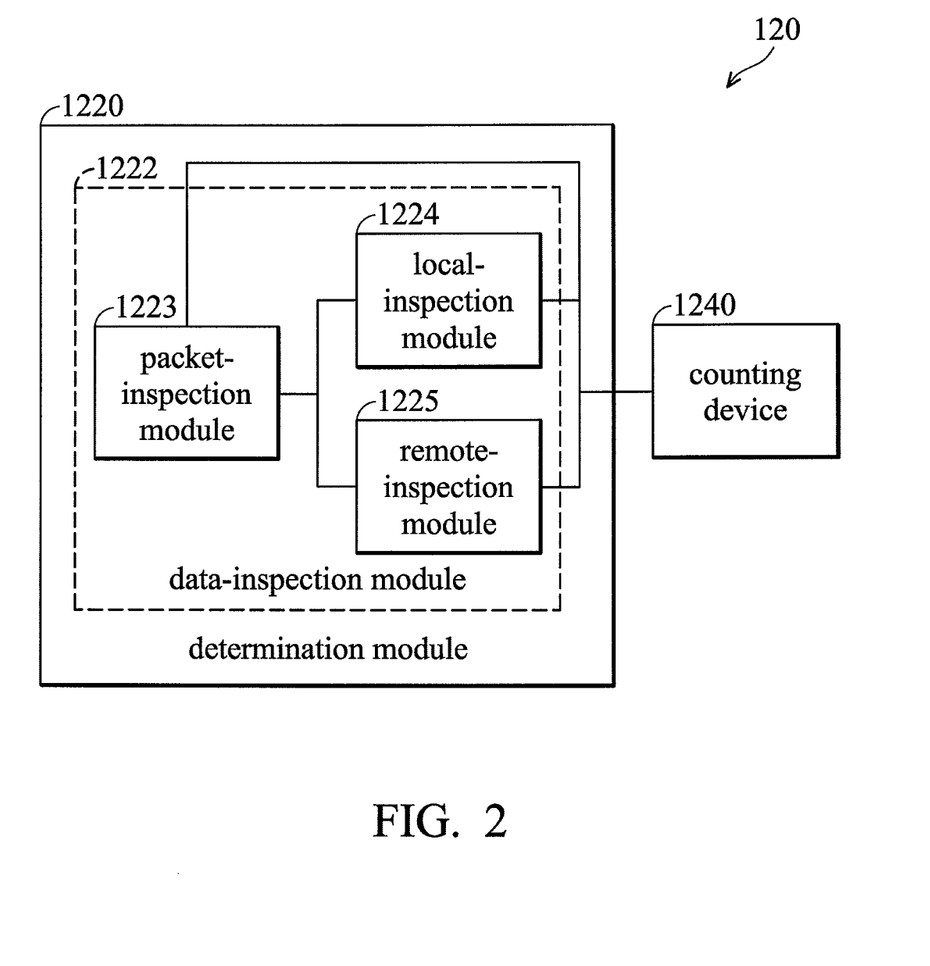
FIG. 2 is a schematic diagram illustrating an embodiment of a network-transmission inspection module of the present invention.

FIG. 2 is a schematic diagram illustrating an embodiment of a network-transmission inspection module of the present invention. In this embodiment, the network-transmission inspection module 120 includes a determination module 1220 and a counting device 1240, but it is not limited thereto. The determination module 1220 includes a data-inspection module 1222 arranged to check whether the data transmission path DATAP between the network-communication device 200 and the network-connection module 110 is functioning properly. The counting device 1240 is arranged to accumulate a network abnormal number according to the results of the check of the data transmission path DATAP. Moreover, when the network abnormal number is greater than a first predetermined number, the counting device 1240 is further arranged to enable the network-communication device 200 to be restarted. For example, when the network abnormal number is greater than the first predetermined number, the counting device 1240 can produce a notice signal to the network-connection module 110. The network-connection module 110 enables the network-communication device 200 to be restarted according to the notice signal produced by the counting device 1240, but it is not limited thereto. In another embodiment of the present invention, when the network abnormal number is greater than the first predetermined number, the counting device 1240 is arranged to enable the network-communication device 200 or a display device (not shown) of the network-transmission inspection device 100 to produce the notice signal, and enable the network-communication device 200 to be restarted according to an input in response to the notice signal, wherein the input is received by the network-communication device 200 or the network-transmission inspection device 100.

The data-inspection module 1222 further includes a packet-inspection module 1223, a local inspection module 1224 and a remote inspection module 1225. The packet-inspection module 1223 is arranged to check whether the number of RX packets has increased at a first predetermined time interval when the network-connection module 110 is connected with the base station 300. When the number of RX packets has increased, the packet-inspection module 1223 is arranged to enable the counting device 1240 to reset the network abnormal number to zero. When the number of RX packets has not increased, the packet-inspection module 1223 is arranged to check whether the number of TX packets has increased. When the number of TX packets has not increased, the packet-inspection module 1223 is arranged to enable the local inspection module 1224. When the number of TX packets has increased, the packet-inspection module 1223 is arranged to enable the remote inspection module 1225.

It should be noted that, in one of the embodiments, the first predetermined time interval is decreased as the network abnormal number is increased. For example, the network abnormal number is 0, and the first predetermined time interval is 4 seconds. When the network abnormal number is increased to 1, the first predetermined time interval is decreased to 2 seconds accordingly. When the network abnormal number is increased to 2, the first predetermined time interval is decreased to 1 second accordingly, and so on. Namely, when the network abnormal number is 0, the packet-inspection module 1223 checks whether the number of RX packets has increased at intervals of 4 seconds. When the network abnormal number is increased to 1, the packet-inspection module 1223 checks whether the number of RX packets has increased at intervals of 2 seconds. When the network abnormal number is increased to 2, the packet-inspection module 1223 checks whether the number of RX packets has increased at intervals of 1 second, but it is not limited thereto.

The local inspection module 1224 is arranged to check whether the connection between the network-connection module 110 and the network-communication device 200 is functioning properly when both the number of RX packets and the number of TX packets have not increased. For example, the local inspection module 1224 is arranged to check whether the connection between the network-connection module 110 and the network-communication device 200 is functioning properly by using the Dynamic Host Configuration Protocol (DHCP), but it is not limited thereto. When the connection between the network-connection module 110 and the network-communication device 200 is not functioning properly, the local inspection module 1224 enables the counting device 1240 to increase the network abnormal number by 1. When the connection between the network-connection module 110 and the network-communication device 200 is functioning properly, the local inspection module 1224 enables the counting device 1240 to reset the network abnormal number to zero.

"The remote inspection module 1225 is arranged to check whether the connection between the network-communication device 200 and the base station 300 is functioning properly when the number of RX packets has not increased and the number of TX packets has increased. For example, the remote inspection module 1225 is arranged to check whether the connection between the network-communication device 200 and the base station 300 is functioning properly by using the Ping network-testing method, but it is not limited thereto. When the connection between the network-communication device 200 and the base station 300 is not functioning properly, the remote inspection module 1225 enables the counting device 1240 to increase the network abnormal number by 1. When the connection between the network-communication device 200 and the base station 300 is functioning properly, the remote inspection module 1225 enables the counting device 1240 to reset the network abnormal number to zero."

Figure 3:
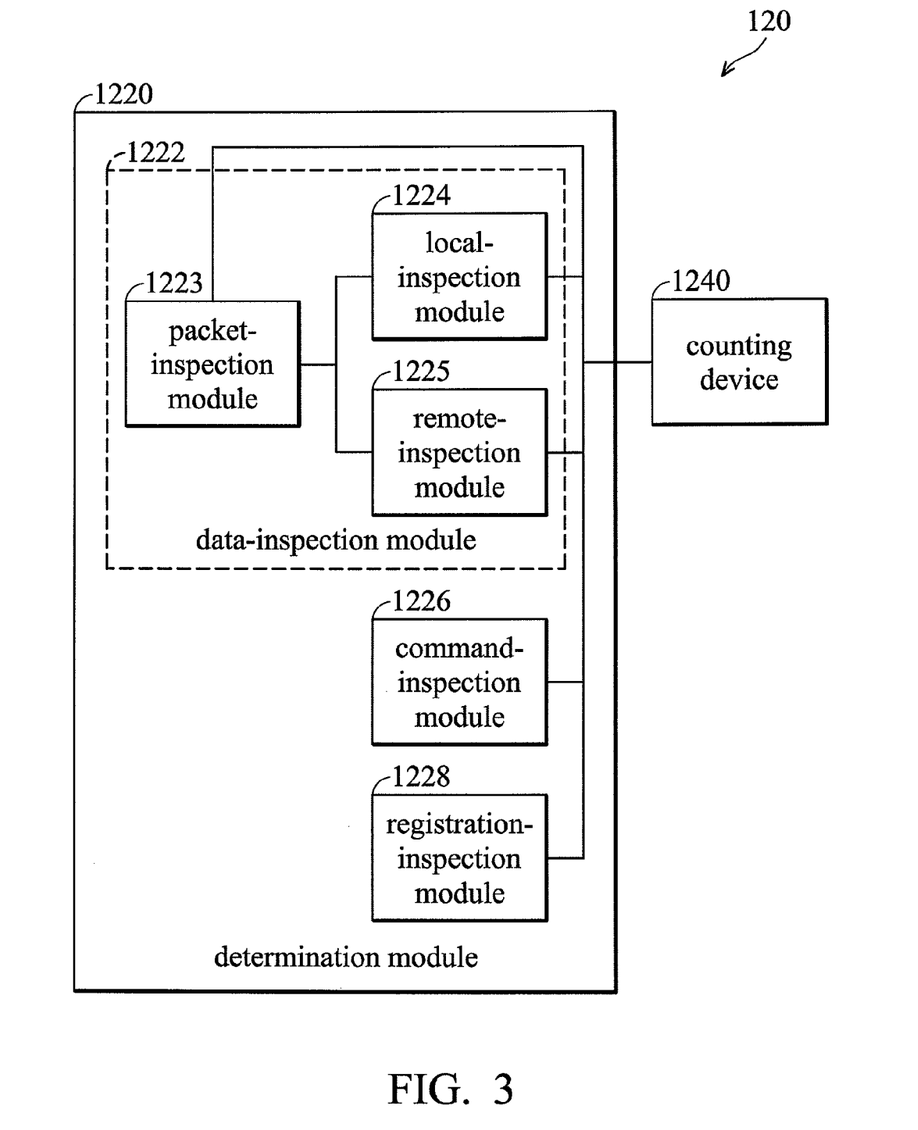
FIG. 3 is a schematic diagram illustrating another embodiment of a network-transmission inspection module of the present invention.

FIG. 3 is a schematic diagram illustrating another embodiment of a network-transmission inspection module of the present invention. The network-transmission inspection module 120 of FIG. 3 is similar to the network-transmission inspection module 120 of FIG. 2 except that the network-transmission inspection module 120 of FIG. 3 further includes a command-inspection module 1226 and a registration-inspection module 1228, and the counting device 1240 is further arranged to accumulate a command abnormal number and a registration abnormal number. Therefore, the details of the data-inspection module 1222 and the counting device 1240 of the network-transmission inspection module 120 of FIG. 3 can be referred to in FIG. 2.

The command-inspection module 1226 is arranged to check whether the signal transmission of a control path COMP between the network-connection module 110 and the network-communication device 200 is functioning properly at a second predetermined time interval. When the signal transmission of the control path COMP is not functioning properly, the command-inspection module 1226 enables the counting device 1240 to increase the command abnormal number to 1. When the signal transmission of the control path COMP is functioning properly, the command-inspection module 1226 enables the counting device 1240 to reset the command abnormal number to zero. It should be noted that when the command abnormal number is greater than a second predetermined number, the counting device 1240 enables the network-communication device 200 to be restarted.

For example, when the command abnormal number is greater than the second predetermined number, the counting device 1240 produces a notice signal to the network-connection module 110. The network-connection module 110 enables the network-communication device 200 to be restarted according to the notice signal produced by the counting device 1240, but it is not limited thereto. In another embodiment, when the command abnormal number is greater than the second predetermined number, the counting device 1240 enables the network-communication device 200 or a display (not shown) of the network-transmission inspection device 100 to produce the notice signal, and enables the network-communication device 200 to be restarted according to an input in response to the notice signal, wherein the input can be received by the network-transmission inspection device 100 or the network-communication device 200.

It should be noted that, in one embodiment, the second predetermined time interval is decreased as the command abnormal number is increased. For example, the command abnormal number is 0, and the second predetermined time interval is 4 seconds. When the command abnormal number is increased to 1, the second predetermined time interval is decreased to 2 seconds accordingly. When the command abnormal number is increased to 2, the second predetermined time interval is decreased to 1 second accordingly, and so on. Namely, when the command abnormal number is 0, the command-inspection module 1226 checks whether the signal transmission of the control path COMP is functioning properly at intervals of 4 seconds. When the command abnormal number is increased to 1, the command-inspection module 1226 checks whether the signal transmission of the control path COMP is functioning properly at intervals of 2 seconds. When the command abnormal number is increased to 2, the command-inspection module 1226 checks whether the signal transmission of the control path COMP is functioning properly at intervals of 1 second, but it is not limited thereto.

The registration-inspection module 1228 is arranged to check whether the registration status of the network-communication device 200 and the base station 300 is proper at a third predetermined time interval after the network-communication device 200 has successfully registered on the base station 300. When the registration status is not proper, the registration-inspection module 1228 enables the counting device 1240 to increase the registration abnormal number to 1. When the registration status is proper, the registration-inspection module 1228 enables the counting device 1240 to reset the registration abnormal number to 0. It should be noted that, when the registration abnormal number is greater than a third predetermined number, the counting device 1240 enables the network-communication device 200 to be restarted.

For example, when the registration abnormal number is greater than the third predetermined number, the counting device 1240 is arranged to produce a notice signal, and provide the notice signal to the network-connection module 110. The network-connection module 110 enables the network-communication device 200 to be restarted according to the notice signal produced by the counting device 1240, but it is not limited thereto. In another embodiment, when the registration abnormal number is greater than the third predetermined number, the counting device 1240 enables the network-communication device 200 or a display (not shown) of the network-transmission inspection device 100 to produce the notice signal, and enables the network-communication device 200 to be restarted according to an input in response to the notice signal, wherein the input can be received by the network-transmission inspection device 100 or the network-communication device 200.

It should be noted that, in one embodiment of the present invention, the third predetermined time interval is decreased as the registration abnormal number is increased. For example, the registration abnormal number is 0, and the third predetermined time interval is 4 seconds. When the registration abnormal number is increased to 1, the third predetermined time interval is decreased to 2 seconds accordingly. When the registration abnormal number is increased to 2, the third predetermined time interval is decreased to 1 second accordingly, and so on. Namely, when the registration abnormal number is 0, the registration-inspection module 1228 checks whether the registration status of the network-communication device 200 and the base station 300 is proper at intervals of 4 seconds after the network-communication device 200 has successfully registered on the base station 300. When the registration abnormal number is increased to 1, the registration-inspection module 1228 checks whether the registration status of the network-communication device 200 and the base station 300 is proper at intervals of 2 seconds. When the registration abnormal number is increased to 2, the registration-inspection module 1228 checks whether the registration status of the network-communication device 200 and the base station 300 is proper at intervals of 1 second, but it is not limited thereto.

Figure 4A:
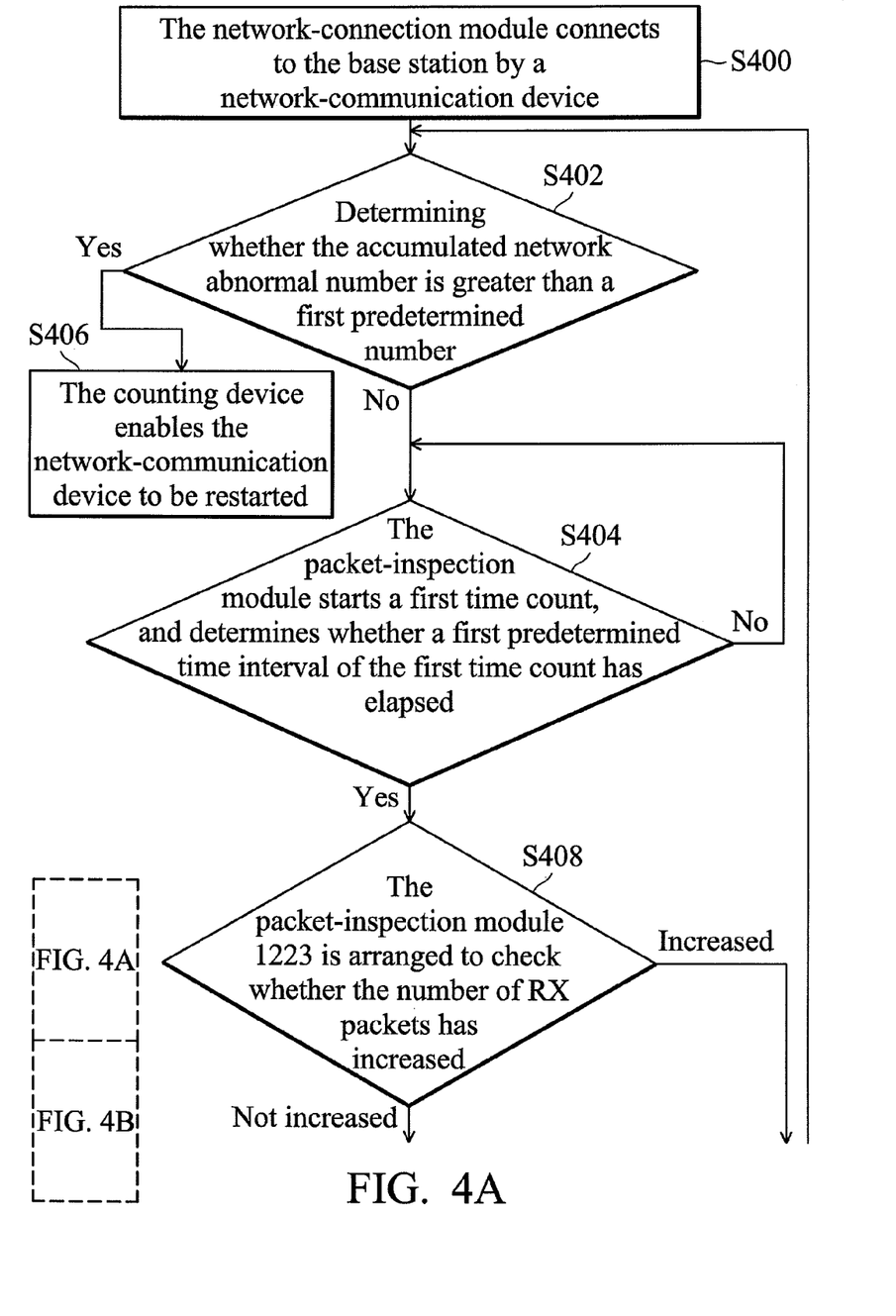
FIGS. 4A and 4B are a flowchart of a network-transmission inspection method according to an embodiment of the present invention.
Figure 4B:
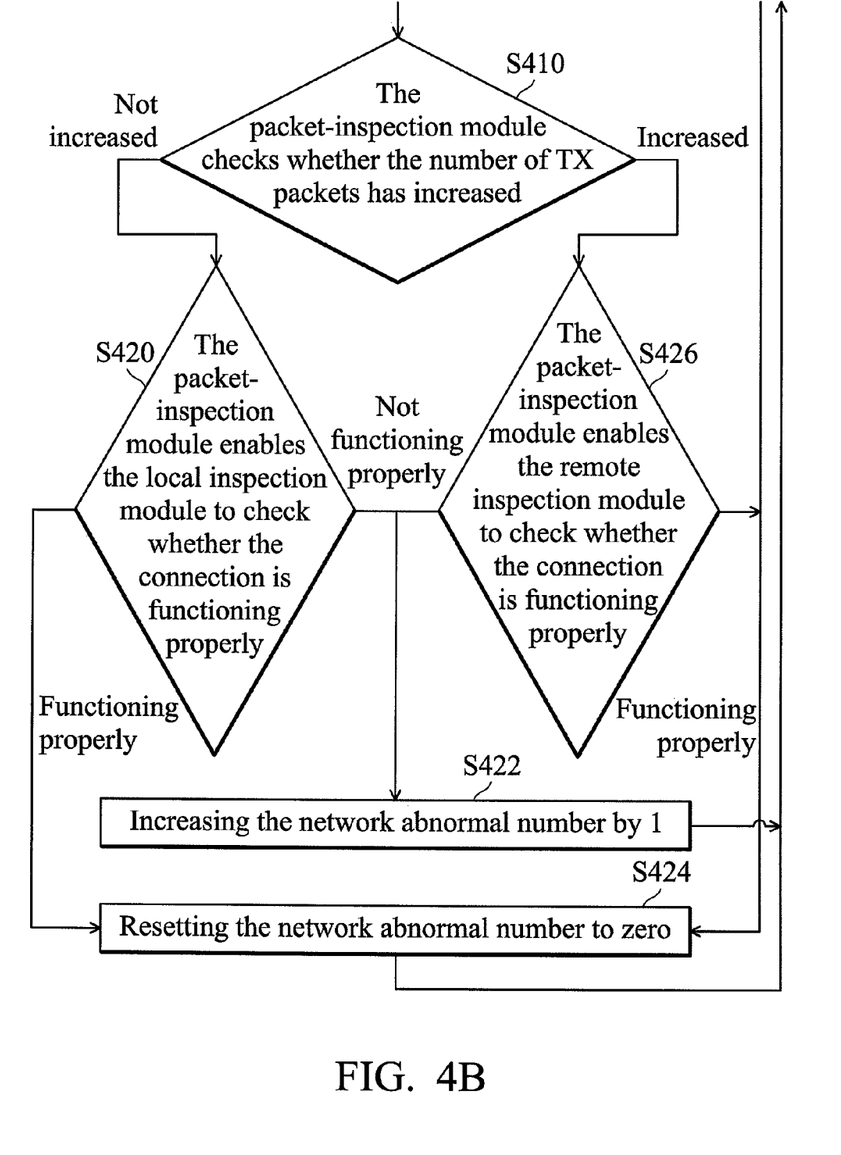

FIGS. 4A and 4B are a flowchart of a network-transmission inspection method according to an embodiment of the present invention. The network-transmission inspection method is applied to the network-transmission inspection device 100. The process starts at step S400.

In step S400, the network-connection module 110 is arranged to connect to the base station 300 through a network by a network-communication device 200 according to an enable signal, wherein the network-connection module 110 is arranged to receive at least one RX packet from the base station 300 by the network-communication device 200 and transmit at least one TX packet to the base station 300 by the network-communication device 200. It should be noted that the network-communication device 200 connects to the base station 300 through a 4G network, but it is not limited thereto. For example, the network-communication device 200 can also connect to the base station 300 by 3G network, wired network, wireless fidelity (WIFI) or other networks.

In step S402, the counting device 1240 is arranged to determine whether the accumulated network abnormal number is greater than a first predetermined number. When the network abnormal number is greater than the first predetermined number, the method proceeds to step S406. When the network abnormal number is not greater than the first predetermined number, the method proceeds to step S404. It should be noted that, in one embodiment, the default value of the network abnormal number is 0.

Next, in step S404, the packet-inspection module 1223 starts a first time count, and determines whether a first predetermined time interval of the first time count has elapsed. When the first predetermined time interval of the first time count has elapsed, the method proceeds to step S408. When the first predetermined time interval of the first time count has not elapsed, the packet-inspection module 1223 continues to determine whether the first predetermined time interval of the first time count has elapsed. It should be noted that, in another embodiment of the present invention, the first time count can be executed by a timer unit (not shown) of the network-transmission inspection device 100.

In step S406, the counting device 1240 is further arranged to enable the network-communication device 200 to be restarted. For example, when the network abnormal number is greater than the first predetermined number, the counting device 1240 can produce a notice signal to the network-connection module 110. The network-connection module 110 enables the network-communication device 200 to be restarted according to the notice signal produced by the counting device 1240, but it is not limited thereto. In another embodiment of the present invention, when the network abnormal number is greater than the first predetermined number, the counting device 1240 enables the network-communication device 200 or a display (not shown) of the network-transmission inspection device 100 to produce the notice signal, and enables the network-communication device 200 to be restarted according to an input in response to the notice signal, wherein the input can be received by the network-transmission inspection device 100 or the network-communication device 200.

In step S408, the packet-inspection module 1223 is arranged to check whether the number of RX packets has increased. When the number of RX packets has not increased, the method proceeds to step S410. When the number of RX packets has increased, the method proceeds to step S424.

It should be noted that, in one of the embodiments of the present invention, the first predetermined time interval is decreased as the network abnormal number is increased. For example, the network abnormal number is 0, and the first predetermined time interval is 4 seconds. When the network abnormal number is increased to 1, the first predetermined time interval is decreased to 2 seconds accordingly. When the network abnormal number is increased to 2, the first predetermined time interval is decreased to 1 second accordingly, and so on. Namely, when the network abnormal number is 0, the packet-inspection module 1223 checks whether the number of RX packets has increased at intervals of 4 seconds. When the network abnormal number is increased to 1, the packet-inspection module 1223 checks whether the number of RX packets has increased at intervals of 2 seconds. When the network abnormal number is increased to 2, the packet-inspection module 1223 checks whether the number of RX packets has increased at intervals of 1 second, but it is not limited thereto.

In step S410, the packet-inspection module 1223 check whether the number of TX packets has increased. When the number of TX packets has not increased, the method proceeds to step S420. When the number of TX packets has increased, the method proceeds to step S426.

In step S420, the packet-inspection module 1223 enables the local inspection module 1224. The local inspection module 1224 is arranged to check whether the connection between the network-connection module 110 and the network-communication device 200 is functioning properly. For example, the local inspection module 1224 is arranged to check whether the connection between the network-connection module 110 and the network-communication device 200 is functioning properly by using the Dynamic Host Configuration Protocol (DHCP), but it is not limited thereto. When the connection between the network-connection module 110 and the network-communication device 200 is not functioning properly, the method proceeds to step S422. When the connection between the network-connection module 110 and the network-communication device 200 is functioning properly, the method proceeds to step S424.

In step S422, the counting device 1240 increases the network abnormal number by 1. Next, the method returns to step S402, and the counting device 1240 continues to determine whether the accumulated network abnormal number is greater than the first predetermined number.

In step S424, the counting device 1240 resets the network abnormal number to zero. Next, the method returns to step S402, and the counting device 1240 continues to determine whether the accumulated network abnormal number is greater than the first predetermined number.

"In step S426, the packet-inspection module 1223 enables the remote inspection module 1225. The remote inspection module 1225 is arranged to check whether the connection between the network-communication device 200 and the base station 300 is functioning properly when the number of RX packets has not increased and the number of TX packets has increased. For example, the remote inspection module 1225 is arranged to check whether the connection between the network-communication device 200 and the base station 300 is functioning properly by using the Ping network-testing method, but it is not limited thereto. When the connection between the network-communication device 200 and the base station 300 is not functioning properly, the method proceeds to step S422. When the connection between the network-communication device 200 and the base station 300 is functioning properly, the method proceeds to step S424."

Figure 5A:
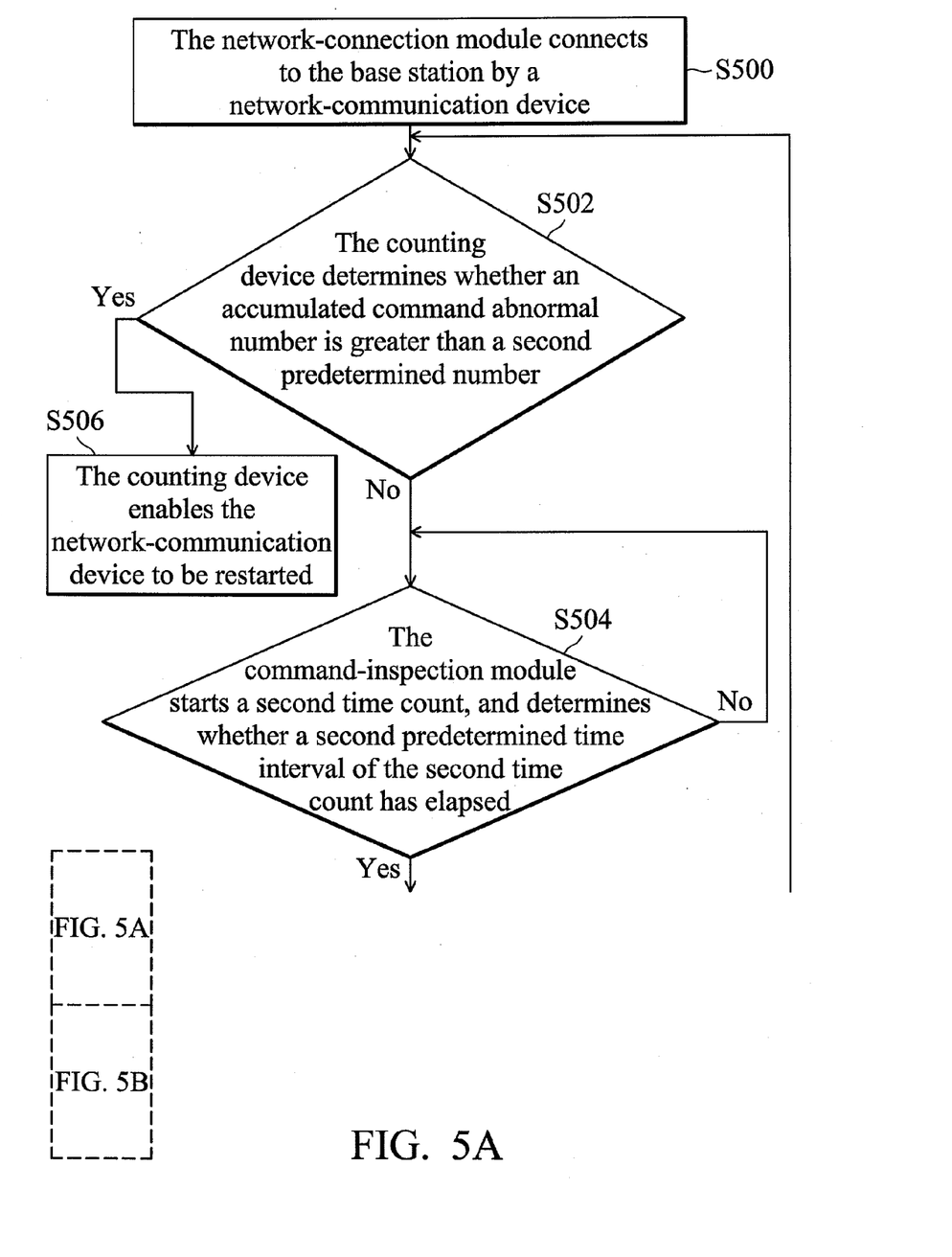
FIGS. 5A and 5B are a flowchart of another network-transmission inspection method according to an embodiment of the present invention.
Figure 5B:
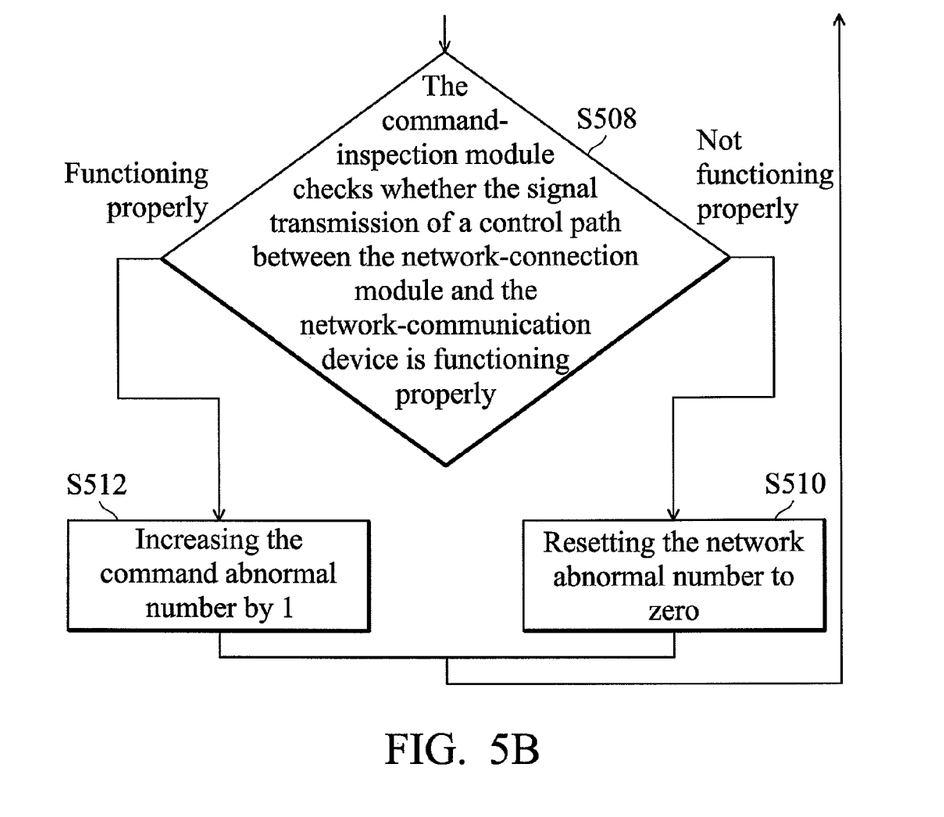

FIG. 5 is a flowchart of another network-transmission inspection method according to an embodiment of the present invention. The network-transmission inspection method is applied to the network-transmission inspection device 100. The process starts at step S500. It should be noted that the network-transmission inspection method of FIG. 5 and the network-transmission inspection method of FIG. 4 can be applied to the network-transmission inspection device 100 simultaneously.

In step S500, the network-connection module 110 is arranged to connect to the base station 300 through a network by a network-communication device 200 according to an enable signal, wherein the network-connection module 110 is arranged to receive at least one RX packet from the base station 300 by the network-communication device 200 and transmit at least one TX packet to the base station 300 by the network-communication device 200. It should be noted that the network-communication device 200 connects to the base station 300 through a 4G network, but it is not limited thereto. For example, the network-communication device 200 can also connect to the base station 300 by a 3G network, wired network, wireless fidelity (WIFI) or other networks.

In step S502, the counting device 1240 is arranged to determine whether an accumulated command abnormal number is greater than a second predetermined number. When the command abnormal number is greater than the second predetermined number, the method proceeds to step S506. When the command abnormal number is not greater than the second predetermined number, the method proceeds to step S504. It should be noted that, in one of the embodiments of the present invention, the default value of the command abnormal number is 0.

Next, in step S504, the command-inspection module 1226 starts a second time count, and determines whether a second predetermined time interval of the second time count has elapsed. When the second predetermined time interval of the second time count has elapsed, the method proceeds to step S508. When the second predetermined time interval of the first time count has not elapsed, the command-inspection module 1226 continues to determine whether the second predetermined time interval of the second time count has elapsed. It should be noted that, in another embodiment of the present invention, the first time count and/or the second time count can be executed by a timer unit (not shown) of the network-transmission inspection device 100.

In step S506, the counting device 1240 is further arranged to enable the network-communication device 200 to be restarted. For example, when the command abnormal number is greater than the second predetermined number, the counting device 1240 produces a notice signal to the network-connection module 110. The network-connection module 110 enables the network-communication device 200 to be restarted according to the notice signal produced by the counting device 1240, but it is not limited thereto. In another embodiment, when the command abnormal number is greater than the second predetermined number, the counting device 1240 enables the network-communication device 200 or a display (not shown) of the network-transmission inspection device 100 to produce the notice signal, and enables the network-communication device 200 to be restarted according to an input in response to the notice signal, wherein the input can be received by the network-transmission inspection device 100 or the network-communication device 200.

In step S508, the command-inspection module 1226 is arranged to check whether the signal transmission of a control path COMP between the network-connection module 110 and the network-communication device 200 is functioning properly. When the signal transmission of the control path COMP is not functioning properly, the method proceeds to step S510. When the signal transmission of the control path COMP is functioning properly, the method proceeds to step S512.

It should be noted that, in one embodiment, the second predetermined time interval is decreased as the command abnormal number is increased. For example, the command abnormal number is 0, and the second predetermined time interval is 4 seconds. When the command abnormal number is increased to 1, the second predetermined time interval is decreased to 2 seconds accordingly. When the command abnormal number is increased to 2, the second predetermined time interval is decreased to 1 second accordingly, and so on. Namely, when the command abnormal number is 0, the command-inspection module 1226 checks whether the signal transmission of the control path COMP is functioning properly at intervals of 4 seconds. When the command abnormal number is increased to 1, the command-inspection module 1226 checks whether the signal transmission of the control path COMP is functioning properly at intervals of 2 seconds. When the command abnormal number is increased to 2, the command-inspection module 1226 checks whether the signal transmission of the control path COMP is functioning properly at intervals of 1 second, but it is not limited thereto.

In step S510, the counting device 1240 increases the command abnormal number by 1. Next, the method returns to step S502, the counting device 1240 continues to determine whether the accumulated command abnormal number is greater than the second predetermined number.

In step S512, the counting device 1240 resets the network abnormal number to zero. Next, the method returns to step S502, and the counting device 1240 continues to determine whether the accumulated command abnormal number is greater than the second predetermined number.

Figure 6A:
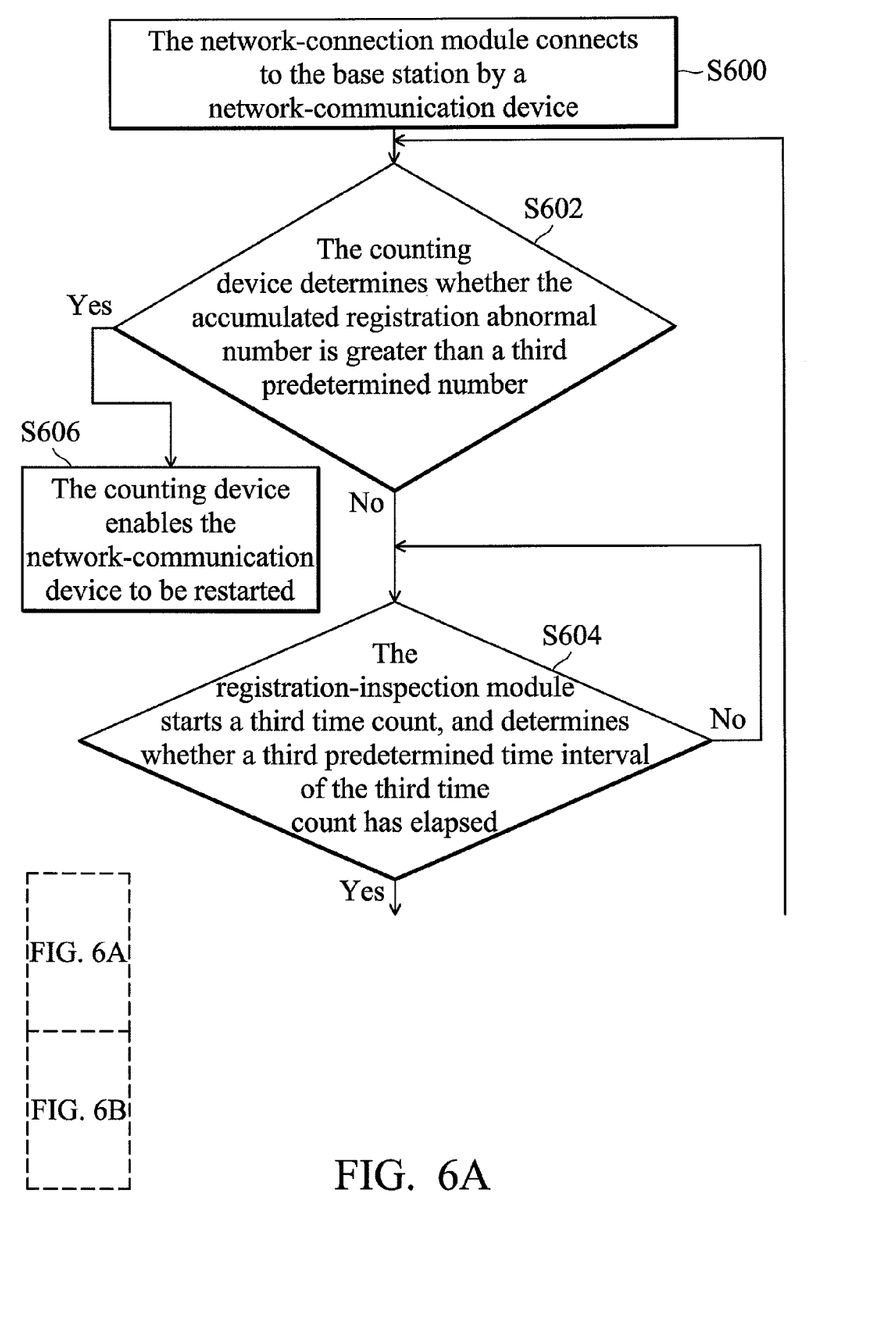
FIGS. 6A and 6B are a flowchart of another network-transmission inspection method according to an embodiment of the present invention.
Figure 6B:
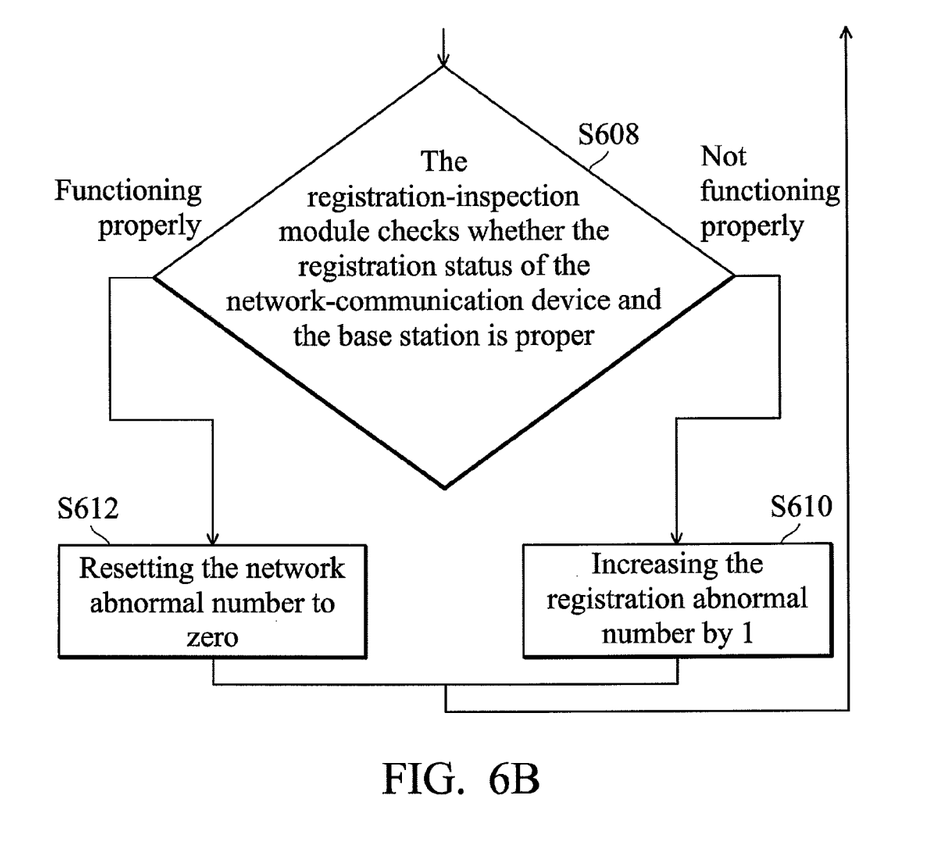

FIG. 6 is a flowchart of another network-transmission inspection method according to an embodiment of the present invention. The network-transmission inspection method is arranged to be applied to the network-transmission inspection device 100. The process starts at step S600. It should be noted that, in the network-transmission inspection method of FIG. 6, the network-transmission inspection method of FIG. 5 and/or the network-transmission inspection method of FIG. 4 can be applied to the network-transmission inspection device 100 simultaneously, but it is not limited thereto.

In step S600, the network-connection module 110 is arranged to connect to the base station 300 through a network by a network-communication device 200 according to an enable signal, wherein the network-connection module 110 is arranged to receive at least one RX packet from the base station 300 by the network-communication device 200 and transmit at least one TX packet to the base station 300 by the network-communication device 200. It should be noted that the network-communication device 200 connects to the base station 300 through a 4G network, but it is not limited thereto. For example, the network-communication device 200 can also connect to the base station 300 by a 3G network, wired network, wireless fidelity (WWI) or other networks.

In step S602, the counting device 1240 is arranged to determine whether the accumulated registration abnormal number is greater than a third predetermined number. When the accumulated registration abnormal number is greater than the third predetermined number, the method proceeds to step S606. When the accumulated registration abnormal number is not greater than the third predetermined number, the method proceeds to step S604. It should be noted that, in one embodiment, the default value of the registration abnormal number is 0.

Next, in step S604, the registration-inspection module 1228 starts a third time count, and determines whether a third predetermined time interval of the third time count has elapsed. When the third predetermined time interval of the first time count has elapsed, the method proceeds to step S608. When the third predetermined time interval of the first time count has not elapsed, the registration-inspection module 1228 continues to determine whether the third predetermined time interval of the third time count has elapsed. It should be noted that, in another embodiment, the first time count, the second time count and/or the third time count can be executed by a timer unit (not shown) of the network-transmission inspection device 100.

In step S606, the counting device 1240 is further arranged to enable the network-communication device 200 to be restarted. For example, when the registration abnormal number is greater than the third predetermined number, the counting device 1240 is arranged to produce a notice signal, and provide the notice signal to the network-connection module 110. The network-connection module 110 enables the network-communication device 200 to be restarted according to the notice signal produced by the counting device 1240, but it is not limited thereto. In another embodiment, when the registration abnormal number is greater than the third predetermined number, the counting device 1240 enables the network-communication device 200 or a display (not shown) of the network-transmission inspection device 100 to produce the notice signal, and enables the network-communication device 200 to be restarted according to an input in response to the notice signal, wherein the input can be received by the network-transmission inspection device 100 or the network-communication device 200.

In step S608, the registration-inspection module 1228 is arranged to check whether the registration status of the network-communication device 200 and the base station 300 is proper at a third predetermined time interval after the network-communication device 200 has successfully registered on the base station 300. When the registration status is not proper, the method proceeds to step S610. When the registration status is proper, the method proceeds to step S612.

It should be noted that, in one embodiment of the present invention, the third predetermined time interval is decreased as the registration abnormal number is increased. For example, the registration abnormal number is 0, and the third predetermined time interval is 4 seconds. When the registration abnormal number is increased to 1, the third predetermined time interval is decreased to 2 seconds accordingly. When the registration abnormal number is increased to 2, the third predetermined time interval is decreased to 1 second accordingly, and so on. Namely, when the registration abnormal number is 0, the registration-inspection module 1228 checks whether the registration status of the network-communication device 200 and the base station 300 is proper at intervals of 4 seconds after the network-communication device 200 has successfully registered on the base station 300. When the registration abnormal number is increased to 1, the registration-inspection module 1228 checks whether the registration status of the network-communication device 200 and the base station 300 is proper at intervals of 2 seconds. When the registration abnormal number is increased to 2, the registration-inspection module 1228 checks whether the registration status of the network-communication device 200 and the base station 300 is proper at intervals of 1 second, but it is not limited thereto.

In step S610, the counting device 1240 increases the registration abnormal number by 1. Next, the method returns to step S602, the counting device 1240 continues to determine whether the accumulated registration abnormal number is greater than the third predetermined number.

In step S612, the counting device 1240 resets the network abnormal number to zero. Next, the method returns to step S602, the counting device 1240 continues to determine whether the accumulated registration abnormal number is greater than the third predetermined number.

The network-transmission inspection device 100 and the network-transmission inspection method provided by the present invention can check whether the respective transmission paths are functioning properly and reduce the number of packets produced by the conventional inspection method. Therefore, the network-transmission inspection device 100 and the network-transmission inspection method provided by the present invention provide user a network-transmission inspection method with fewer resources required, and enable the network-communication device 200 to be restarted when the abnormal times are greater than the predetermined number.

Data transmission methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A network-transmission inspection device, comprising:
a network-connection apparatus, communicating with a base station through a network by a network-communication device wherein the network-connection apparatus receives at least one RX packet from the base station through the network-communication device and transmits at least one TX packet to the base station through the network-communication device; and
a network-transmission inspection apparatus, connected to the network-connection apparatus to check the connection status between the network-connection apparatus and the network-communication device and the connection status between the network-communication device and the base station according to the number of RX packets and the number of TX packets,
wherein the network-transmission inspection apparatus further comprising: a counting device, accumulating a network abnormal number;
a packet-inspection apparatus, checking whether the number of RX packets and the number of TX packets have increased at a first predetermined time interval when the network-connection apparatus is communicating with the base station;
a local inspection apparatus, connected to the packet-inspection apparatus and the counting device, checking whether the connection between the network-connection apparatus and the network-communication device is functioning properly when both the number of RX packets and the number of TX packets have not increased, and enabling the counting device to increase the network abnormal number by 1 when the connection between the network-connection apparatus and the network-communication device is not functioning properly, and a remote inspection apparatus, connected to the packet-inspection apparatus and the counting device, checking whether the connection between the network-communication device and the base station is functioning properly when the number of RX packets has not increased and the number of TX packets has increased, and enabling the counting device to increase the network abnormal number by 1 when the connection between the network-communication device and the base station is not functioning properly.

2. The network-transmission inspection device as claimed in claim 1, wherein the local inspection apparatus enables the counting device to reset the network abnormal number to 0 when the connection between the network-connection apparatus and the network-communication device is functioning properly.

3. The network-transmission inspection device as claimed in claim 1, wherein the packet-inspection apparatus enables the counting device to reset the network abnormal number to 0 when the number of RX packets has increased.

4. The network-transmission inspection device as claimed in claim 1, wherein the counting device enables the network-communication device to be restarted when the network abnormal number is higher than a first predetermined number.

5. The network-transmission inspection device as claimed in claim 1, wherein the remote inspection apparatus enables is further arranged to enable the counting device to reset the network abnormal number to 0 when the connection between the network-communication device and the base station is functioning properly.

6. The network-transmission inspection device as claimed in claim 1, wherein the counting device accumulates a command abnormal number, and the network-transmission inspection apparatus further comprises a command-inspection apparatus checking whether the transmission of a control path COMP between the network-connection apparatus and the network-communication device is functioning properly at a second predetermined time interval, and the network-transmission inspection apparatus enables the counting device to increase the command abnormal number by 1 when the control path COMP between the network-connection apparatus and the network-communication device is not functioning properly.

7. The network-transmission inspection device as claimed in claim 6, wherein the counting device enables the network-communication device to be restarted when the command abnormal number is higher than a second predetermined number.

8. The network-transmission inspection device as claimed in claim 6, wherein the command-inspection apparatus enables the counting device to reset the command abnormal number to 0 when the control path COMP between the network-connection apparatus and the network-communication device is functioning properly.

9. The network-transmission inspection device as claimed in claim 1, wherein the counting device accumulates a registration abnormal number, and the network-transmission inspection apparatus further comprises a registration-inspection apparatus checking whether a registration status of the network-communication device and the base station is proper at a third predetermined time interval after the network-communication device has successfully registered on the base station, and the network-transmission inspection apparatus enables the counting device to increase the registration abnormal number by 1 when the registration status of the network-communication device and the base station is not proper.

10. The network-transmission inspection device as claimed in claim 9, wherein the counting device enables the network-communication device to be restarted when the registration abnormal number is higher than a third predetermined number.

11. The network-transmission inspection device as claimed in claim 9, wherein a command-inspection apparatus enables the counting device to reset the registration abnormal number to 0 when the registration status of the network-communication device and the base station is proper.

12. A network-transmission inspection method, applied to a network-transmission inspection device, comprising:
connecting the network-transmission inspection device of the network-transmission inspection device with a base station through a network by a network-communication device
checking whether the number of RX packets received by the network-transmission inspection device from the base station through the network-communication device has increased at a first predetermined time interval when the network-transmission inspection device is connected with the base station;
checking whether the number of TX packets transmitted by the network-transmission inspection device to the base station through the network-communication device has increased when the number of RX packets has not increased;
checking whether the connection between the network-transmission inspection device and the network-communication device is functioning properly when the number of TX packets has not increased; increasing a network abnormal number by 1 when the connection between the network-transmission inspection device and the network-communication device is not functioning properly;

checking whether the connection between the network-communication device and the base station is functioning properly when the number of TX packets has increased; and increasing the network abnormal number by 1 when the connection between the network-communication device and the base station is not functioning properly.

13. The network-transmission inspection method as claimed in claim 12, further comprising resetting the network abnormal number to 0 when the connection between the network-transmission inspection device and the network-communication device is functioning properly.

14. The network-transmission inspection method as claimed in claim 12, further comprising resetting the network abnormal number to 0 when the number of RX packets has increased.

15. The network-transmission inspection method as claimed in claim 12, further comprising restarting the network-communication device when the network abnormal number is higher than a first predetermined number.

16. The network-transmission inspection method as claimed in claim 12, further comprising resetting the network abnormal number to 0 when the connection between the network-communication device and the base station is functioning properly.

17. The network-transmission inspection method as claimed in claim 12, further comprising:

checking whether the transmission of a control path COMP between the network-transmission inspection device and the network-communication device is functioning properly at a second predetermined time interval when the network-transmission inspection device is connected to the base station; and increasing a command abnormal number by 1 when the control path COMP between the network-transmission inspection device and the network-communication device is not functioning properly.

18. The network-transmission inspection method as claimed in claim 17, further comprising restarting the network-communication device when the command abnormal number is higher than a second predetermined number.

19. The network-transmission inspection method as claimed in claim 17, further comprising resetting the command abnormal number to 0 when the control path COMP between the network-transmission inspection device and the network-communication device is functioning properly.

20. The network-transmission inspection method as claimed in claim 12, further comprising: checking whether a registration status of the network-communication device and the base station is proper at a third predetermined time interval after the network-communication device has successfully registered on the base station; and increasing a registration abnormal number by 1 when the registration status of the network-communication device and the base station is not proper.

21. The network-transmission inspection method as claimed in claim 20, further comprising restarting the network-communication device when the registration abnormal number is higher than a third predetermined number.

22. The network-transmission inspection method as claimed in claim 20, further comprising resetting the registration abnormal number to 0 when the registration status of the network-communication device and the base station is proper.

* * * * *